United States Patent

[11] 3,620,820

| [72] | Inventor | Patrick Henry Hess<br>Diamond Bar, Calif. |
|---|---|---|
| [21] | Appl. No. | 569,036 |
| [22] | Filed | Aug. 1, 1966 |
| [45] | Patented | Nov. 16, 1971 |
| [73] | Assignee | Chevron Research Company<br>San Francisco, Calif. |

[54] ANTIWETTING METHODS AND COMPOSITIONS
6 Claims, No Drawings

[52] U.S. Cl. .................................................. 117/124,
117/135.5, 117/145, 117/148, 106/2, 106/13,
106/287
[51] Int. Cl. .................................................. C03c 17/30
[50] Field of Search ............................................ 106/2, 13,
287 C; 117/123 C, 123 D, 124 F, 135.1, 135.5,
145, 148, 126 GS; 260/448.8, 448.8 A

[56] References Cited
UNITED STATES PATENTS

| 3,012,006 | 12/1961 | Holbrook et al. | 260/46.5 |
|---|---|---|---|
| 3,015,585 | 1/1962 | Holbrook et al. | 117/161 |
| 3,127,433 | 3/1964 | Tarrant | 260/448.2 |
| 3,298,997 | 1/1967 | Holbrook | 260/46.5 |

*Primary Examiner*—Julius Frome
*Assistant Examiner*—Lorenzo B. Hayes
*Attorneys*—A. L. Snow, F. E. Johnston, G. F. Magdeburger
and D. L. Hagmann ABSTRACT: Hydroxylic surfaces are rendered resistant to wetting and fogging for long periods of time by the application to such surfaces of a minor amount of a lower trialkoxy compound of silicone.

ANTIWETTING METHODS AND COMPOSITIONS

This invention relates to a method of rendering a surface resistant to wetting and fogging. More particularly, it relates to the application of novel silicofluorocarbon compounds to siliceous surfaces thereby rendering them resistant to wetting. Still more particularly, it relates to the treatment of hydroxylic surfaces with novel silicofluorocarbon compounds thereby rendering them resistant to wetting for long periods of time.

It is known to treat siliceous surfaces, such as glass in automobile and aircraft windshields and the window panes of domestic and commercial buildings with a variety of chemical agents and mixtures in order to render them resistant to wetting and fogging with some degree of success. However, among the unsatisfactory features of these treatments are the relatively short duration of the desired characteristic as limited by mechanical attrition, natural attrition by the elements, and other limitations, such as interference with light transmission and the like.

It has now been found that hydroxylic surfaces can be rendered substantially resistant to wetting by the application thereto of a minor amount of a compound of the formula:

$$C_mF_nH_p-_{xq}-(CH_2)_r-Si(OR)_3$$

in which R is a lower alkyl group, X is a bivalent radical and the subscript $m$ is an integer in the range 4–12, inclusive; $n$ equals $2m$ plus one minus $p$; $p$ is zero or an integer less than six and is less than $n/2$; $q$ is zero or one and $r$ is zero or in the range 1–3, inclusive, and when $q$ is zero, $r$ is zero. In the formula X is selected from the group consisting of:

-OCH$_2$CHOHCH$_2$O-
-OCH(CH$_2$OH)CH$_2$O-
-O(CH$_2$)$_2$O-
-OCH$_2$CHOHCH$_2$NH-
-OCH(CH$_2$OH)CH$_2$NH-
-O(CH$_2$)$_2$NH-
-S-
-NH-
-N(CH$_3$)-

In particular, when a siliceous hydroxylic surface, such as glass, is coated with a compound of the above formula in an application as by an aerosol spray, the so treated surface has remarkably improved antiwetting characteristics. Neither water nor oil appreciably wets the surface. During the application or shortly thereafter, there appears to be a chemical interaction between the glass and the applied compound. In any event a strongly bonded film of molecular proportions appears to result which persists for months, even under the direct action of wind, sun and rain, making such a protective treatment particularly useful, for example, for automobile and aircraft windshields and for windows of multistoried buildings. The film does not appear to affect light transmission.

Similarly, when cloth, paper, leather, wood and other surfaces containing hydroxyl groups as in cellulose etc. are treated as above, they too become resistant to wetting, which characteristic persists.

By a minor amount is meant sufficient of the compound to produce at least a monomolecular film, preferably sufficient to yield a molecular film in the range from one to about 50 molecular layers.

In accordance with this invention, it has been found that the application of a small amount of a lower trialkoxy silane, such as HCF$_2$(CF$_2$)$_9$CH$_2$OCH$_2$CH(OH)CH$_2$OCH$_2$CH$_2$CH$_2$Si(OCH$_3$)$_3$ to glass greatly improves the wetting and fogging resistance of the glass. The application is conveniently accomplished by use of a volatile inert carrier solvent, such as acetone, light hydrocarbon fractions, methanol, 2-propanol, ethanol, lower ethers and the like in an ordinary aerosol bomb-type dispenser wherein the concentration of the active compound is in the range from about 0.01 to 1 weight percent and higher. In aerosol dispensers freon-type compounds may be used as the propellant.

Representative compounds useful in the subject invention include the following:

CH$_3$(CF$_2$)$_4$CH$_2$CH$_2$Si(OCH$_3$)$_3$
CHF$_2$(CF$_2$)$_5$CH$_2$CH$_2$Si(OC$_2$H$_5$)$_3$
CF$_3$(CF$_2$)$_3$CH$_2$NH(CH$_2$)$_3$Si(OCH$_3$)$_3$
HCF$_2$(CF$_2$)$_5$CH$_2$N(CH$_3$)(CH$_2$)$_2$Si(OC$_2$H$_5$)$_3$
HCF$_2$(CF$_2$)$_5$CH$_2$OC(CHOH)CH$_2$O(CH$_2$)$_3$Si(OCH$_3$)$_3$
HCF$_2$(CF$_2$)$_7$CH$_2$S(CH$_2$)$_2$Si(OC$_2$H$_5$)$_3$
HCF$_2$(CF$_2$)$_9$CH$_2$OCH$_2$CHOHCH$_2$NH(CH$_2$)$_3$Si(OC$_2$H$_5$)$_3$
HCF$_2$(CF$_2$)$_9$CH$_2$OCH(CH$_2$OH)CH$_2$NH(CH$_2$)$_3$Si(OCH$_3$)$_3$
CF$_3$(CF$_2$)$_6$CH$_2$O(CH$_2$)$_2$Si(OCH$_3$)$_3$
CF$_3$(CF$_2$)$_6$CHO(CH$_2$)$_3$Si[OCH(CH$_3$)$_2$]$_3$
H(CF$_2$)$_{10}$CH$_2$OCH$_2$CHOHCH$_2$NH(CH$_2$)$_2$Si(OCH$_2$H$_5$)$_3$
H(CF$_2$)$_{10}$CH$_2$OCH$_2$CH(CH$_2$OH)NH(CH$_2$)$_3$Si(OC$_2$H$_5$)$_3$
H(CF$_2$)$_{10}$CH$_2$OCH$_2$CHOHCH$_2$O(CH$_2$)$_3$Si(OCH$_3$)$_3$
CF$_3$(CF$_2$)$_7$CH$_2$N(CH$_2$)$_2$Si(OCH$_3$)$_3$ and the like compounds.

By lower alkoxy in regard to the subject silanes is meant C$_1$–C$_3$ alkoxy groups, inclusive.

For the better understanding of those skilled in the art, the following examples are solely for purpose of illustration and not by way of limitation.

PREPARATION OF ANTIWETTING AGENTS

Example 1

An essentially equimolar portion of the fluoroalcohol, 1H, 1H, 11H-eicosafluoro-1-undecanol and 3-glycidoxypropyltrimethoxysilane with an added catalytic amount of benzyltrimethylammoniumhydroxide was heated at the reflux temperature for about 48 hours. Nuclear magnetic resonance and infrared spectra indicated substantially complete conversion based upon the epoxy spectral function.

Example 2

Approximately equimolar quantities of 1H, 1H-pentadecafluoro-1-octanol and 3-glycidoxypropyltrimethoxysilane were heated at the reflux in the presence of added quaternary ammonium hydroxide catalyst until substantially complete reaction had taken place.

Example 3

A solution of 1H, 1H, 11H-eicosafluoro-1-undecyl tosylate was reacted with potassium iodide in an inert solvent, thereby converting the ester to 1H, 1H, 11H-eicosafluoro-1-iodide. These perfluoroalkyl iodides were found to be readily convertible by standard metathetical replacement reactions to other functional groups, such as perfluoroalkyl amines. Thus by reaction with δ-aminopropyltriethoxysilane the desired antiwetting agent HCF$_2$(CF$_2$)$_9$CH$_2$NH(CH$_2$)$_3$Si(OC$_2$H$_5$)$_3$ is formed. The reaction is conveniently followed by iodimetric titration of reaction product aliquots. Similarly, by displacement of iodide by sulfhydryl, i.e., -SH, and coupling as by reaction with 3-glycidoxypropyltrimethoxysilane, the corresponding mercapto-linked antiwetting agent is obtainable. Usually where the final linkage is obtained by reaction with an epoxide ring, the product appears to be a mixture with the primary adduct prevailing and the methylol product, i.e., R$_f$CH$_2$-S-CH(CH$_2$OH)-CH$_2$Si(OR)$_3$, being present in lesser amounts, wherein R$_f$ indicates a perfluoro or essentially perfluoxo group.

Example 4—Wetting Test

Solutions of the reaction products of examples 1 and 2 above (approximately 1–2 percent by weight) were prepared using 2-propanol solvent.

Clear, air-dried glass plates were partially immersed in the vertical position in the above stirred solutions for about 1 minute and withdrawn and held in the vertical position while drying at room temperature or dried while held in the vertical in a forced air oven at 200–220° F. for about 45 minutes.

Whether oven dried or air-dried, the surfaces of the dipped plates were resistant to wetting by oils and water, as shown by the shape and contact angle of drops of water and drops of oil placed on the plates held on the horizontal plane.

Example 5—Adhesion Test

Glass plates coated as in example 4 were washed with acetone, then scrubbed suing a washcloth and an alkylbenzene sulfonate detergent, and finally were scoured with a scrub brush and an abrasive household cleanser powder. No appreciable diminution of the wet resistance was visually detectable or apparent.

Example 6—Spray Coating

Solutions of $HCF_2(CF_2)_9CH_2OCH_2CH(OH)CH_2O-CH_2CH_2CHB2-Si(OCH_3)_3$ in 2-propanol containing 0.016 to 0.008 mol of active per liter of solution were prepared. Glass plates were then spray coated with the solution using venturi-type nozzles. Solutions containing as little as 1 gram of active per liter of solution were found to produce durable antiwetting surface coatings. Lower alkanols, such as methanol, ethanol and propanol, are useful solvent media.

Example 7—Weather-O-Meter Test

Glass plates (1) were spray coated with the 1-gram solution as in example 6, and separate plates (2) were spray coated with an unreacted mixture of fluoroundecanol and 3-glycidoxypropyltrimethoxysilane (i.e., the unreacted feed components of example 2). After 23 hours under the Weather-O-Meter test conditions (ASTM E42–64 Type DH) the plates treated as in (1) had excellent antiwetting characteristics, while those treated in (2) had no resistance to wetting.

Example 8—Fade-O-Meter Test

Glass plates spray coated with the 1-gram active solution as in example 7 were placed in a Fade-O-Meter unit and tested (ASTM E42–64 Type H with no spray). After 1924 hours, the glass plates had no apparent reduction in their resistance to wetting.

Example 9—Dishwashing Test

Glass plates coated as in (1) and (2) of example 7 were tested in a commercial dishwasher, except that the water temperature was substantially higher than in conventional practice in order to obtain an accelerated test. After eight cycles the plates coated as in 7(1) had very good resistance to wetting, while those treated as in 7(2) had no detectable resistance to wetting.

Example 10—Automobile Glass Surface

The windshield and other glass surface of a recent model automobile were cleaned and partially spray coated as in example 7(1) and the automobile driven in conventional use. These surfaces, treated and untreated, were tested by spraying with water and noting the runoff rate and beading. After three weeks the treated glass surface subject to windshield wiper action had undergone some reduction in its resistance to wetting. Other treated surfaces had had no detectable reduction in antiwetting characteristics. As between treated and untreated glass surfaces, water runoff for the former was substantially faster and more complete than for the latter.

Example 11—Window Test

Several weather-side windows of a commercial laboratory building were thoroughly cleaned and spray coated using a solution constituted as in example 7(1), except that a conventional aerosol bomb spray unit charged with Freon 12 was employed. After an exposure period of 82 days, treated windows continued to exhibit good resistance to wetting by water spraying.

Example 12—Mold Release Agent Test

A commercial unsaturated polyester molding composition was used to test the mold release characteristics of glass molds which had been spray coated by an aerosol spray as in example 11. When the polyester is cast and cured in an untreated glass mold, the casting adheres tenaciously to the mold. The spray treated molds readily and easily released the casting.

The foregoing examples demonstrate that the novel compositions herein disclosed adhere strongly and for prolonged periods to siliceous surfaces, such as glass, and the like. In a similar manner wood samples, such as commercial plywood, were rendered resistant to wetting by a spray coating treatment using the aerosol procedure and composition as in the foregoing examples. This treatment rendered the samples resistant to wetting such that no warpage of the sample had occurred after successive subjection to water vapor for a prolonged period, i.e., 100 percent humidity at ambient temperature, and immersion in cold water for 2 hours followed by drying at 110° C. for 4 hours. On the other hand, nonhydroxylic materials, such as metallic surfaces and the like, do not exhibit the prolonged resistance to wetting described above.

In view of the foregoing, it appears that there is a chemical interaction between the subject compounds and hydroxylic surfaces, that is, surfaces having free hydroxyl groups available, which may be represented as follows:

$$R_fZSi(OCH_3)_3 + B(OH)_n \rightarrow R_fZSi(OCH_3)_2OB(OH)_{n-1}$$
$$HOCH_3 \uparrow$$

wherein $R_fZ$ corresponds to the above described fluorine containing radicals as attached to trialkyoxy silanes and B is a hydroxyl group bearing substrate. Applicant, of course, does not wish to be bound by the foregoing theory because, other and similar chemical representations being equally as reasonable or more so, can be formulated to explain the above described experimental facts.

The embodiments of the invention in which an exclusive property is claimed are as follows:

We claim:

1. Method of improving the wetting resistance of a hydroxyl containing surface selected from the group consisting of glass, cloth, paper, wood and other cellulosics containing hydroxyl groups which comprises applying to said surface an amount of a compound sufficient to produce at least monomolecular film, said compound being of the formula $$C_mF_nH_p-X_q-(CH_2)_r-Si(OR)_3$$

in which OR is a lower alkoxy group, X is a bivalent radical and the subscript $m$ is an integer in the range 4–12, inclusive; $n$ equals $2m$ plus one minus $p$; $p$ is zero or an integer less than six and is less than $n/2$; $q$ is zero or one and $r$ is zero or in the range 1–3, inclusive, and when $q$ is zero, $r$ is zero; wherein X is selected from the group consisting of $-OCH_2CHOHCH_2O-$, $-OCH(CH_2OH)CH_2O-$, $-O(CH_2)_2O-$, $-OCH_2CHOHCH_2NH-$, $-OCH(CH_2OH)CH_2NH-$, $-O(CH_2)_2NH-$, $-S-$, $-NH-$ and $-N(CH_3)-$, thereby making said surface resistant to wetting for substantial periods.

2. Method as in claim 1 wherein said surface is a siliceous surface.

3. Method of claim 2 wherein said surface is glass.

4. Method of claim 1 wherein said surface is wood.

5. Method of claim 1 wherein said application is by means of an aerosol spray and in which said compounds are dissolved in a volatile inert carrier solvent.

6. The method, as in claim 1, further characterized in that said compound is $HCF_{2(CF_2)_9}CH_2OCH_2CH(OH)CH_2OCH_2CH_2CH_2Si(OCH_3)_3$

* * * * *

PO-1050
(5/69)

UNITED STATES PATENT OFFICE
CERTIFICATE OF CORRECTION

Patent No. 3,620,820    Dated November 16, 1971

Inventor(s) Patrick Henry Hess

It is certified that error appears in the above-identified patent and that said Letters Patent are hereby corrected as shown below:

Col. 1, line 74, "$CH_3(CF_2)_4CH_2CH_2Si(OCH_3)_3$" should read --$CF_3(CF_2)_4CH_2CH_2Si(OCH_3)_3$--.

Col. 3, line 3, "suing" should read --using--.

Col. 3, line 12, "$CH_2CH_2CHB2-Si(OCH_3)_3$" should read --$CH_2CH_2CH_2-Si(OCH_3)_3$--.

Col. 4, line 28, "n'7E'1" should read --n-1 + --.

Claim 1, col. 4, line 44, "least monomolecular" should read --least a monomolecular--.

Signed and sealed this 23rd day of May 1972.

(SEAL)
Attest:

EDWARD M. FLETCHER, JR.
Attesting Officer

ROBERT GOTTSCHALK
Commissioner of Patents